United States Patent [19]

Bauerle

[11] 4,134,290

[45] Jan. 16, 1979

[54] TECHNIQUE FOR DETECTING LIQUID METAL LEAKS

[75] Inventor: James E. Bauerle, Pittsburgh, Pa.

[73] Assignee: The United States of America as represented by the United States Department of Energy, Washington, D.C.

[21] Appl. No.: 830,948

[22] Filed: Sep. 6, 1977

[51] Int. Cl.² .............................................. G01M 3/08
[52] U.S. Cl. .................... 73/40.5 R; 73/49.1
[58] Field of Search ...................... 73/40, 40.5 R, 40.7, 73/49.1; 176/19 LD; 15/104.05

[56] References Cited

U.S. PATENT DOCUMENTS

| | | | |
|---|---|---|---|
| 1,796,878 | 3/1931 | Watson | 15/104.05 X |
| 2,617,134 | 11/1952 | Barton, Jr. | 15/104.05 X |
| 3,098,023 | 7/1963 | Schluderberg | 176/19 LD |
| 3,166,901 | 1/1965 | Bliss | 176/19 LD |
| 3,808,433 | 4/1974 | Fite et al. | 250/251 |

FOREIGN PATENT DOCUMENTS 900247 7/1962 United Kingdom ............... 176/19 LD

*Primary Examiner*—Daniel M. Yasich
*Attorney, Agent, or Firm*—M. P. Lynch

[57] ABSTRACT

In a system employing flowing liquid metal as a heat transfer medium in contact with tubular members containing a working fluid, i.e., steam, liquid metal leaks through the wall of the tubular member are detected by dislodging the liquid metal compounds forming in the tubular member at the leak locations and subsequently transporting the dislodged compound in the form of an aerosol to a detector responsive to the liquid metal compound. In the application to a sodium cooled tubular member, the detector would consist of a sodium responsive device, such as a sodium ion detector.

7 Claims, 2 Drawing Figures

TECHNIQUE FOR DETECTING LIQUID METAL LEAKS

This invention resulted from work performed under the Energy Research and Development Administration Contract AT(11-1)-2499.

BACKGROUND OF THE INVENTION

While the use of a liquid metal as a heat transfer medium in systems such as the liquid metal fast breeder reactor has proven to be effective, liquid metal leaks in the steam carrying tubes which are contacted by the liquid metal typically require costly inspection operations which may take many days to complete. While gross indications can be obtained to indicate the presence or absence of a leak, conventional external leak monitoring equipment is incapable of identifying the specific tube and a specific location on the tube where a leak exists.

SUMMARY OF THE INVENTION

It has been observed in experimental tests that when a steam generator tube, which contains small leaks, is allowed to cool down, and the liquid metal reactant, i.e., sodium, and water are removed, the leak location within the tube will usually plug up the sodium reaction products so that a simple pressure test of the steam tube will not reveal the leak locations. Further, other types of leak locating techniques, such as eddy current or ultrasonic flow detection are not sufficiently sensitive to detect small pinhole sized leaks. There is disclosed herein with reference to the accompanying drawings a technique for providing accurate identification of leak locations which is based on the detection of the sodium reaction products which invariably form at a flaw in the tube.

DESCRIPTION OF THE DRAWINGS

The invention will become more readily apparent from the following exemplary description in connection with the accompany drawing.

DESCRIPTION OF THE PREFERRED EMBODIMENT

Figure 1:
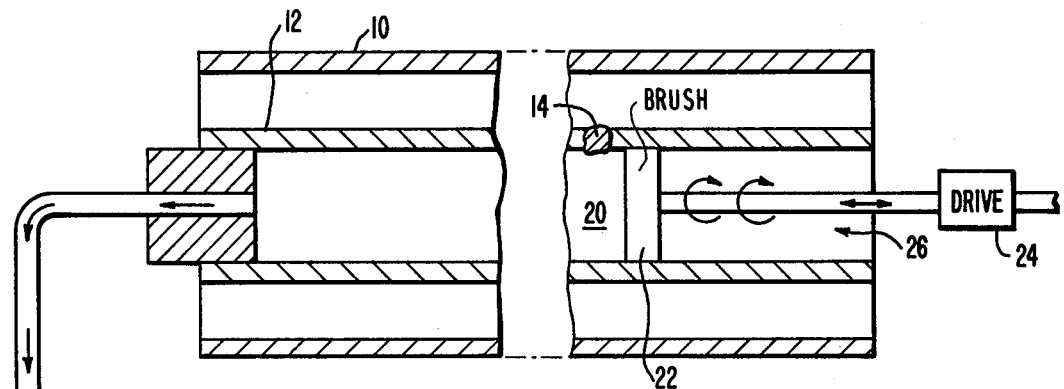
FIG. 1 is a sectioned schematic illustration of a technique for dislodging the liquid metal reaction products produced at a tube leak location which produces an indication in a liquid metal product's detection meter, thereby providing an indication of a tube location at which a liquid metal leak has occurred.

While the following discussion with reference to the accompany drawings will be directed to a tube leak detection apparatus in a system employing sodium or a sodium/potassium liquid metal heat transfer medium in combination with a steam working fluid, it will be appreciated that the technique disclosed will apply similarly to other liquid metal heat transfer media recognizing the need for selecting a detector responsive to the particular liquid metal reaction products associated with the particular liquid metal coolant employed.

In order to locate a small pinhole leak in a sodium-cooled steam carrying tube on the basis of the sodium reaction products formed at the leak location, a highly sensitive chemical detection technique is required. It has been determined experimentally that only a few micrograms of reaction product would be accessible to a reaction product's detector, i.e., a sodium detector, in the event of a pinhole sized leak in a steam generator tube. A commercially available instrument which has proven to be appropriately sensitive to such small amounts of sodium reaction products, is the Westinghouse Sodium Ionization Detector. The Westinghouse detector employs a heated filament to preferentially form sodium $Na^+$ ions from elemental or compound sodium in gas. These sodium ions are in turn collected and electronically recorded. The Westinghouse sodium ionization detector is the subject of pending U.S. patent application Ser. No. 435,389, filed Jan. 21, 1974, assigned to the assignee of the present invention and incorporated herein by reference.

In order for the sodium ionization detector to properly respond to solid sodium compound deposits, the solid sodium compound deposits formed at the tube leak location must first be converted to vapor or aerosal form. To produce a vapor from a sodium compound would require a significantly high temperature with its inherent disadvantages. An alternate approach, consists of converting the solid sodium compound present at a tube leak location into a fine particle suspension in a fluid, such as a gas, i.e., an aerosol.

A disperser consisting of a mechanical, electrical, pneumatic or other physical means to convert solid sodium reaction products in or near a sodium leak into a dispersion of fine particles in a gas, and a sodium aerosol detector, such as Westinghouse Sodium Ionization Detector, respond to the presence of sodium or compound sodium particles dispersed in the gas, thus providing an indication of the tube leak location.

While the disperser, which converts the solid composition of sodium reaction products from bulk solid form into a fine particulate aerosol form by dislodging particles of the solid composition, may consist of a rotating or oscillating mechanical brush, an air jet with or without coarse particles, i.e., aluminum oxide, a spark discharged to the tube walls, or other means of tube surface agitation, a rotating mechanical brush has been chosen in the illustrated embodiment for the purpose of simplicity.

The sectioned schematic illustration in FIG. 1 consists of a sodium flow tube 10 coaxially disposed about a steam flow tube 12 such that the flow of sodium within the sodium flow tube 10 contacts the external surface of the steam flow tube 12 to provide the desired heat transfer operation.

Prior to the inspection of the steam flow tube 12 for sodium leak locations 14, the sodium or sodium containing liquid metal coolant is removed from the sodium flow tube 10 and the water or steam is removed from the steam flow tube 12. As noted earlier, the removal of the sodium and water and the subsequent cooling of the tube members will result in the formation of a solid sodium compound deposit at a leak location 14 in the steam flow tube. This sodium compound deposit extends through the wall of the steam flow tube to the inner surface of the tube 12.

A liquid metal leak locator schematically illustrated as including a disperser member 20, illustrated as consisting of a rotating mechanical brush 22 coupled to a drive means 24 by drive rod 26, and a sodium detector 30 are operatively connected to the steam flow tube 12. The rotating mechanical brush 22, which consists of relatively fine bristles which lightly contact the internal surface of the steam flow tube 12, is moved in a rotating manner along the entire length of the steam flow tube 12 by the drive means 24. When brought in contact with the sodium compound deposit 14 at a leak location in the steam flow tube 12, the bristles of the rotating mechanical brush 22 dislodge particles of the sodium compound deposit which are then drawn from the steam flow tube 12 in an air flow pattern established by pump 40 through the outlet tube 42 to the sodium detector 30. The sodium detector 30 in turn responds to sodium content in the air flow by generating an output signal which is transmitted to leak detector 50. Leak detector 50 may take the form of a visual or audible indicator or a chart recorder providing a record of the profile of the steam tube and the location of the leak. The leak location could also be provided by a sensor, such as an optical system, which monitors the rod 26 to determine the position of the disperser member 20 when a leak is indicated by detector 50.

As indicated above, there are numerous techniques available for dislodging particles from the sodium compound deposit 14 for subsequent detection in a gas flow through the sodium detector 30.

Figure 2:
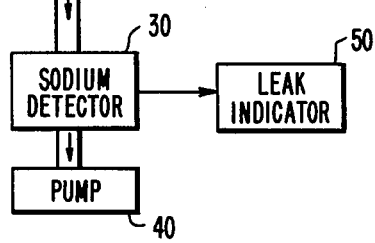
FIG. 2 is a sectioned illustration of a modification of FIG. 1.
Figure 2:
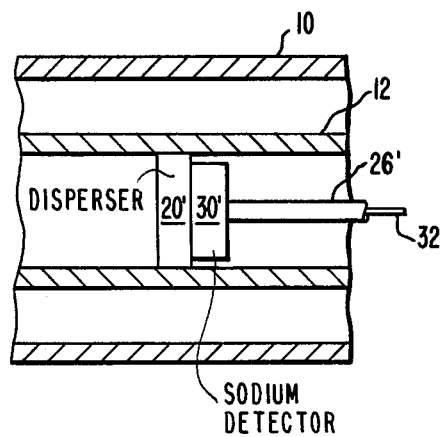

Further, there are variations to the implementation of the combination of the disperser 20 and the detector 30, such as that illustrated in FIG. 2. In the embodiment of FIG. 2, the disperser 20' and the detector 30' form an integral unit which is moved through the steam flow tube 12 as an integral leak locator. This implementation eliminates the need for the pump 40 of FIG. 1. The electrical leads 32 of the detector 30' can be contained within a hollow rod member 26' which couples the integral combination of the disperser 20' and detector 30' to a drive means.

I claim:

1. A method for detecting a liquid metal leak in a heated working fluid flow tube coaxially positioned within a liquid metal flow tube, comprising the steps of,
    removing said liquid metal and said working fluid from respective flow tubes,
    cooling said working fluid flow tube to produce a solid deposit of liquid metal reaction products at a location of said working fluid flow tube corresponding to a tube leak,
    dislodging particles of said solid deposit, and
    detecting said particles to determine the presence of a leak in said working fluid flow tube.

2. A method as claimed in claim 1 including the step of,
    suspending said particles in a fluid prior to the step of detecting said particles.

3. A method as claimed in claim 2 wherein said fluid is a gas.

4. A method as claimed in claim 1 further including the step of,
    identifying the location of the tube leak.

5. Apparatus for detecting a liquid metal leak in a working fluid flow tube coaxially positioned within a liquid metal flow tube on the basis of locating a solid composition of liquid metal reaction products formed at a tube leak location following the removal of the liquid metal and the working following the removal of the liquid metal and the working fluid, from respective said flow tubes, and the subsequent cooling of the working fluid flow tube comprising,
    means for dislodging particles of solid composition of liquid metal reaction products formed at a heated working fluid tube leak location,
    means for suspending said particle in a fluid, wherein said fluid is a gas, and said means for suspending said particles includes means for flowing a gas in said working fluid flow tube, and
    means connected to said gas flow tube for detecting said particles to determine the presence of a leak in said working fluid flow tube.

6. Apparatus as claimed in claim 5 wherein said liquid metal is a sodium composition and said liquid metal reaction products consist of sodium reaction products, and said working fluid is steam.

7. Apparatus as claimed in claim 5 further including means for identifying the location of a leak in said steam flow tube.

* * * * *